United States Patent
Aldiek

(10) Patent No.: US 8,138,465 B2
(45) Date of Patent: Mar. 20, 2012

(54) OPTICAL SENSOR WITH A SINGLE CONTINUOUS INJECTION MOLDED OPTICAL ELEMENT WITH FRESNEL LENSES

(75) Inventor: Norbert Aldiek, Kirchheim/Teck (DE)

(73) Assignee: Leuze Electronic GmbH & Co. KG, Owen/Teck (DE)

( * ) Notice: Subject to any disclaimer, the term of this patent is extended or adjusted under 35 U.S.C. 154(b) by 327 days.

(21) Appl. No.: 11/922,496

(22) PCT Filed: Jun. 29, 2006

(86) PCT No.: PCT/EP2006/006285
§ 371 (c)(1),
(2), (4) Date: Dec. 19, 2007

(87) PCT Pub. No.: WO2007/012374
PCT Pub. Date: Feb. 1, 2007

(65) Prior Publication Data
US 2009/0101791 A1   Apr. 23, 2009

(30) Foreign Application Priority Data

Jul. 28, 2005  (DE) .................... 20 2005 011 847 U

(51) Int. Cl.
*H01J 3/14* (2006.01)
*H01J 5/02* (2006.01)
(52) U.S. Cl. ........................................ 250/216; 250/239
(58) Field of Classification Search ............. 250/227.25, 250/227.24, 239, 216, 221, 227.11; 359/742, 359/711, 868; 340/600, 573.1, 568.1, 541, 340/540, 603, 619, 691.1, 815.45, 815.42, 340/815.43, 815.49, 815.5
See application file for complete search history.

(56) References Cited

U.S. PATENT DOCUMENTS

| | | | | |
|---|---|---|---|---|
| 4,876,446 A * | 10/1989 | Kambe et al. | ................. | 250/221 |
| 4,990,768 A * | 2/1991 | Ito et al. | ........................ | 250/239 |
| 5,142,416 A * | 8/1992 | Nakamura et al. | ............ | 359/742 |
| 5,153,570 A | 10/1992 | Murray | | |
| 5,444,520 A * | 8/1995 | Murano | ........................ | 399/221 |
| 5,825,022 A * | 10/1998 | Takekoshi et al. | ............. | 250/225 |
| 7,079,028 B2 * | 7/2006 | Herrmann et al. | ............ | 340/541 |
| 7,476,848 B2 * | 1/2009 | Argast et al. | ................. | 250/239 |

FOREIGN PATENT DOCUMENTS

EP    0 384 353 A2    8/1990
JP    02-058278    2/1990

OTHER PUBLICATIONS

International Search Report dated Sep. 29, 2006 issued in PCT/EP2006/006285.
Written Action of International Search Office dated Sep. 29, 2006 in PCT/EP2006/006285.

* cited by examiner

*Primary Examiner* — Que T Le
*Assistant Examiner* — Jennifer Bennett
(74) *Attorney, Agent, or Firm* — Venable LLP; Robert Kinberg; Leigh D. Thelen

(57) ABSTRACT

The invention relates to an optical sensor (1) for detecting objects in a monitored area, said sensor comprising at least one transmitter (4) for emitting light rays (3), at least one receiver (6) for receiving transmitted light rays (5), and an evaluation unit (7) for generating an object detection signal in dependence on signals received and present at the receiver (6) output. Furthermore provided is an optical element consisting of an injection-molded plastic part (9). Respectively one first and one second segment of the optical element functions as a Fresnel lens (9a, 9b) for forming a beam with the transmitted light rays (3) and/or the received light rays (5).

14 Claims, 3 Drawing Sheets

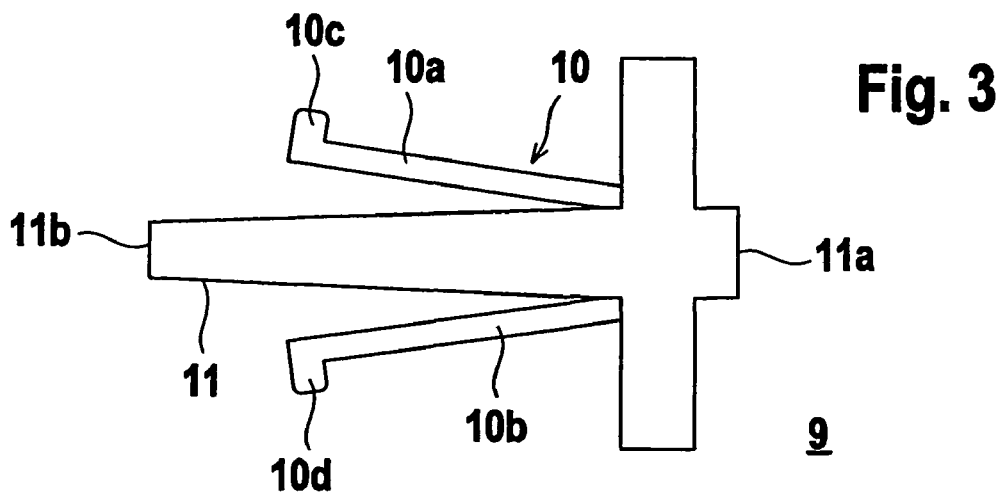
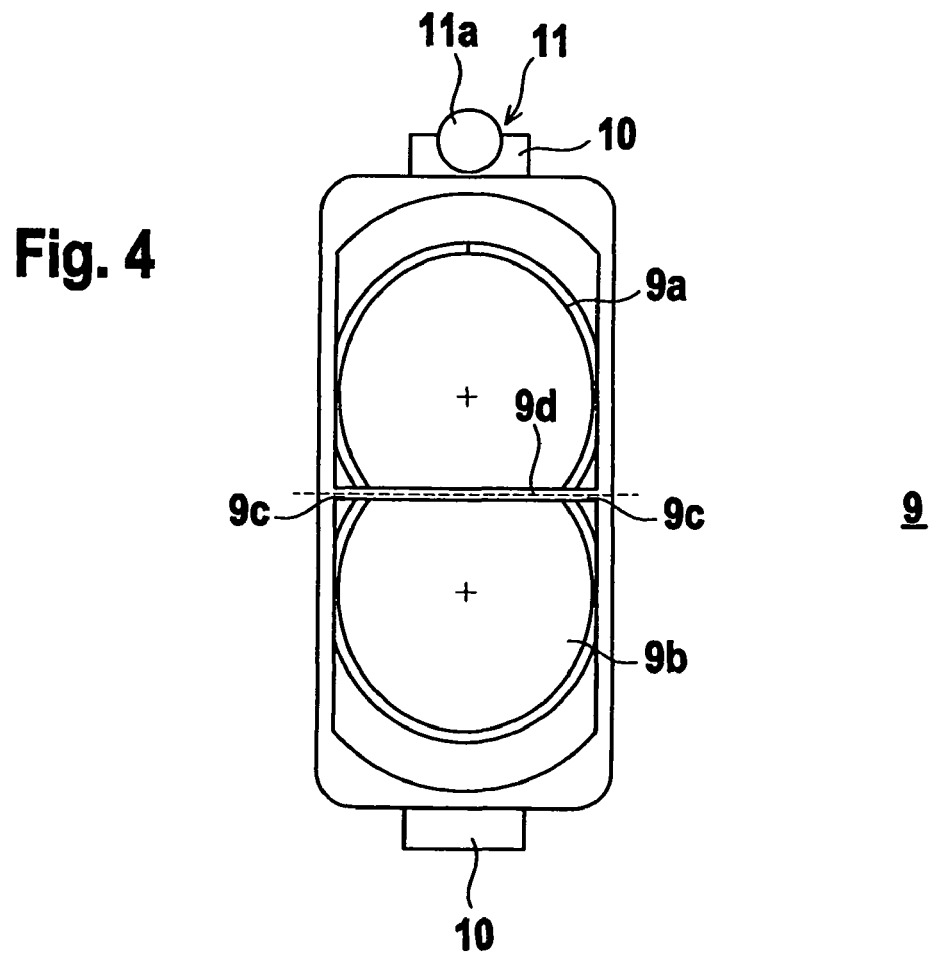

OPTICAL SENSOR WITH A SINGLE CONTINUOUS INJECTION MOLDED OPTICAL ELEMENT WITH FRESNEL LENSES

CROSS-REFERENCE TO RELATED APPLICATIONS

This application is a U.S. National Stage of PCT Application No. PCT/EP2006/006285, filed Jun. 29, 2006, designating the United States, the entire contents of which are incorporated herein by reference. PCT Application No. PCT/EP2006/006285 further claims priority from German Application No. 20 2005 011 847.8, filed on Jul. 28, 2005, which is also claimed herein.

BACKGROUND

The invention relates to an optical sensor as disclosed in the preamble to patent claim 1.

Optical sensors of this type are generally used for detecting objects in a monitored area and can be embodied, for example, as light scanners, reflecting light barriers, distance sensors and the like. The components of the optical sensor, which are integrated into a casing, comprise a transmitter for emitting light rays, a receiver for receiving the transmitted light rays, and an evaluation unit in which an object detection signal is generated from the signals received and present at the receiver output.

A transmitting optic for forming a beam with the transmitted light rays and a receiving optic for focusing the transmitted light rays onto the receiver are typically provided as additional optical components. These optical components are normally embodied as separate lenses, which can consist of glass or plastic. Optical components of this type increase the number of structural elements for the optical sensor, wherein generally separate holders and receptacles must be provided inside the casing for securing these elements.

The plurality of components used in the optical sensor leads to an undesirable increase in the assembly expenditure and generally to relatively high production costs for the optical sensor.

SUMMARY

It is the object of the invention to reduce the production costs for an optical sensor of the aforementioned type, without also reducing its detection sensitivity.

The features disclosed in claim 1 are intended to solve this object. Advantageous embodiments and useful modifications of the invention are described in the dependent claims.

The invention relates to an optical sensor for detecting objects in a monitored area. This optical sensor comprises at least one transmitter for emitting light rays, at least one receiver for receiving the transmitted light rays, and an evaluation unit for generating an object detection signal in dependence on the received signals present at the receiver output. Furthermore provided is an optical element consisting of an injection-molded plastic part. At least one first and one second segment of the optical element each forms at least one Fresnel lens, which functions to form a beam with the transmitted light rays and/or the received light rays.

The invention is thus based on the idea of producing several optical elements embodied as Fresnel lenses from an injection-molded plastic part, thereby achieving a particularly efficient and cost-effective production of these components.

The design of the optical element in this case can be adapted flexibly to the arrangement of the transmitter and the receiver, wherein multiple arrangements of such optical elements in particular can also be produced if the optical sensor is provided with several transmitters and/or receivers.

According to a particularly advantageous embodiment, the injection-molded plastic part as optical element is provided with two Fresnel lenses, wherein one Fresnel lens functions as a transmitting optic that forms a beam with the transmitted light rays and the other Fresnel lens functions as a receiving optic for focusing the received light rays onto the receiver.

One essential advantage lies in the design of the optical element as a Fresnel lens. With Fresnel lenses of this type, large numerical apertures and good imaging qualities can be achieved using thin optical elements. Since the optical elements produced can be thinner, the production costs for such optical elements are correspondingly low because of the shorter production times. This is based on the fact that the dwell times for thin injection-molded plastic parts inside the injection molds can be considerably shorter than for thicker parts.

In principle, the injection-molded plastic part can consist of PMMA (polymethyl methacrylate). It is particularly advantageous if the injection-molded plastic part is composed of polycarbonate, which has a higher refractive index as compared to PMMA. Owing to the higher refractive index, the thickness of the Fresnel lens can be reduced further while the same optical characteristics are maintained.

Since the Fresnel lenses are components of an injection-molded plastic part, the installation of the Fresnel lenses in the casing is also simplified considerably because separate holders and the associated extra work for installing individual lenses can be omitted. The Fresnel lenses as components of the injection-molded plastic part therefore do not need to be aligned individually, but can be mounted as a module inside the casing in which the optical sensor is integrated. The injection-molded plastic part is advantageously also provided with holders as additional elements, especially lock-in means, which allow the optical elements to be secured in a single installation step inside the casing. Since the holders as components of the injection-molded plastic part are embodied integrally with the optical element, the number of individual components for the optical sensor can be reduced further.

The functionality of the injection-molded plastic part can furthermore be expanded advantageously by providing an optical guide channel as additional component, which form part of a status indicator for the optical sensor. The light rays emitted by a light-emitting diode can be conducted through this optical guide channel, so that these are visible as optical signals on the outside of the optical sensor casing.

The optical sensor according to the invention generally can be embodied as measuring sensor, for example as distance sensor, which generates an analog measuring value as object detection signal. The optical sensor according to the invention can furthermore be embodied as binary switching unit, for example as a light scanner or reflective light barrier. In that case, an object detection signal in the form of a binary switching signal is generated in the optical sensor, wherein its switching states indicate whether or not an object is located inside the monitored area.

BRIEF DESCRIPTION OF THE DRAWINGS

The invention is explained in the following with the aid of the drawings, which show in:

FIG. 3: A second view from the side of the injection-molded plastic part;

FIG. 4: A view from above of the injection-molded plastic part according to FIGS. 2 and 3.

DETAILED DESCRIPTION

Figure 1:
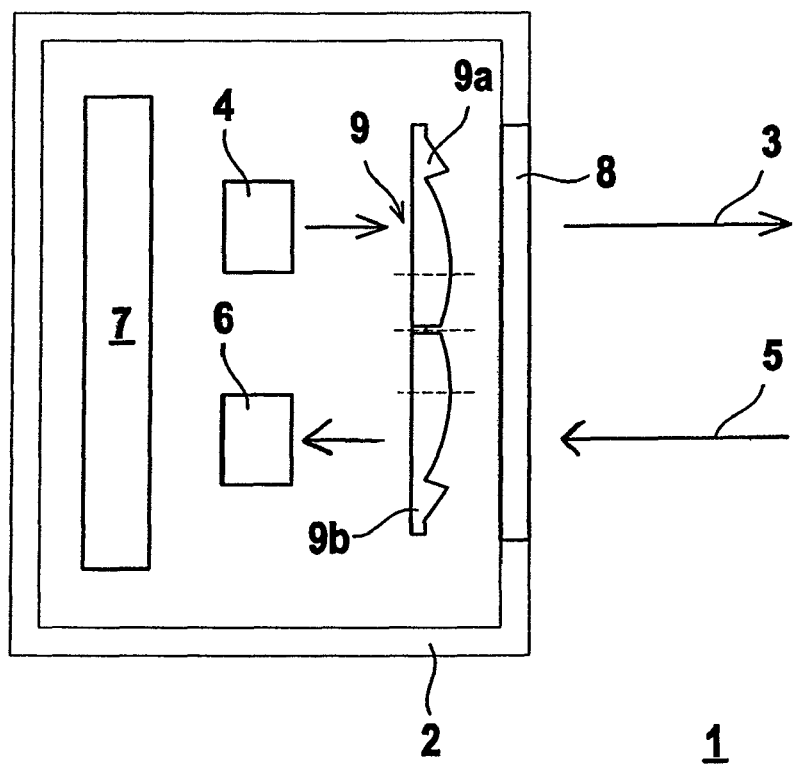
FIG. 1: A schematic representation of an exemplary embodiment of the optical sensor according to the invention.

FIG. 1 schematically illustrates the design of an optical sensor 1 for detecting objects in a monitored area. In the present case, the optical sensor 1 is embodied as a light scanner. The components of the optical sensor 1 are integrated into a casing 2. The optical sensor 1 comprises a transmitter 4 for emitting light rays 3 and a receiver 6 for receiving the transmitted light rays 5, which are connected to an evaluation unit 7. The evaluation unit 7 in the form of a micro-processor or the like is used to control the transmitter 4 and to evaluate the signals received at the receiver 6.

An exit window 8 is located in the front wall. The transmitted light rays 3 are guided through the exit window 8 into the monitored area. In the same way, the transmitted light rays 3 that are reflected back by an object, not shown herein, in the form of receiving light rays 5 are guided through this exit window 8.

The optical sensor embodied as light scanner forms a binary switching unit, meaning a binary switching signal is generated in the evaluation unit 7 with the aid of a threshold evaluation of the received signals. The switching states of this binary signal indicate whether or not an object is located in the monitored area. The switching signal is transmitted via a switching output that is not shown herein.

An injection-molded plastic part 9 is furthermore provided inside the casing 2, wherein segments of this injection-molded plastic part 9 function as optical elements in the form of Fresnel lenses 9a, 9b. A first Fresnel lens 9a functions as transmitting optic for forming a beam with the transmitted light rays 3. The second Fresnel lens 9b functions as receiving optic for focusing the received light rays 5 onto the receiver 6.

The Fresnel lenses 9a, 9b in this case are positioned in one plane, which extends essentially perpendicular to the beam axes of the transmitted light rays 3 and the received light rays 5.

The Fresnel lenses 9a, 9b in principle can also be arranged offset, relative to each other, and can be positioned in different planes. The Fresnel lenses 9a, 9b in general can have the same or different focal lengths.

Figure 2:
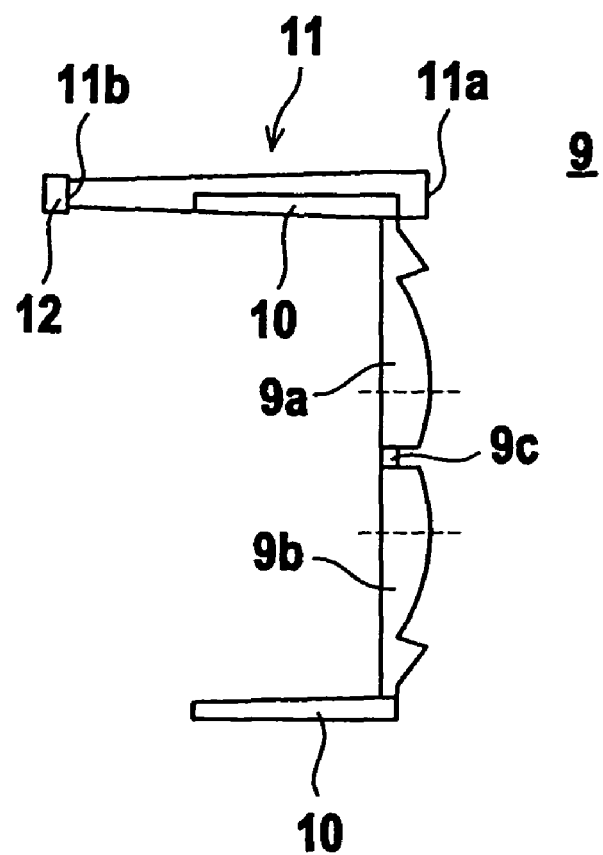
FIG. 2: A first view from the side of an injection-molded plastic part for embodying optical elements for the optical sensor according to FIG. 1.

FIGS. 2 to 4 show a detailed configuration of the injection-molded plastic part 9, which is composed of polycarbonate in the present case.

FIGS. 2 and 4 show that the two Fresnel lenses 9a, 9b are essentially identical in shape and cross-sectional surface. The segments which form the Fresnel lenses 9a, 9b respectively have a rectangular cross-sectional surface. The two segments are connected via two webs 9c that are components of the injection-molded plastic part 9. The webs 9c are arranged at opposite longitudinal edges of the injection-molded plastic part 9. An opening remains between the webs 9c, which forms a gap 9d between the Fresnel lenses 9a, 9b and thus leads to an optical separation of these elements. In principle, the optical elements can also be connected by a single, continuous web.

The injection-molded plastic part 9 is provided with two holding arms 10 for securing it in position inside the casing 2, wherein respectively one holding arm ends at the upper and one at the lower edge of the injection-molded plastic part 9.

The holding arms 10 extend perpendicular to the plane for the Fresnel lenses 9a, 9b. The holding arms 10 in this case project over the plane for the Fresnel lenses 9a, 9b. Each holding arm 10 is embodied in the shape of a fork with two fork blades 10a, 10b, the exposed ends of which are respectively provided with a detent 10c, 10d. The holding arms 10 embodied in this way form means for locking the injection-molded plastic part 9 in place inside a receptacle in the casing 2 for the optical sensor 1.

The injection-molded plastic part 9 according to FIGS. 2 and 4 is furthermore provided with an optical guide channel 11 as additional optical element. The optical guide channel 11, which forms a different segment of the injection-molded plastic part 9, ends at the upper edge of the injection-molded plastic part 9 and thus adjoins the Fresnel lens 9a that forms the transmitting optic. The longitudinal axis of the optical guide channel 11 extends perpendicular to the plane for the Fresnel lenses 9a, 9b. A frontal segment of the optical guide channel 11 projects slightly over the fronts of the Fresnel lenses 9a, 9b. The front segment is closed off by a flat end face 11a. The optical guide channel 11 is tapered continuously toward its back end, which is closed off with a flat end face 11b.

A light-emitting diode 12 that functions as status indicator is attached to the rear end face 11b of the optical guide channel 11, as shown schematically in FIG. 2. Light rays emitted by the light-emitting diode 12, which are not shown herein, travel inside the optical guide channel 11 and emerge at the front 11a. The optical guide channel 11 emits light rays in the visible range. These light rays are visible on the front face 11a on the outside of the casing 2 since the optical guide channel 11 is located in the region of the exit window 8. The front face 11a thus forms an indicator element for indicating the status. A status indicator of this type, for example, can signal the operating state of the optical sensor 1.

LIST OF REFERENCE NUMBERS (1) optical sensor
(2) casing
(3) transmitted light rays
(4) transmitter
(5) received light rays
(6) receiver
(7) evaluation unit
(8) exit window
(9) injection-molded plastic part
(9a) Fresnel lens
(9b) Fresnel lens
(9c) webs
(9d) gap
(10) holding arms
(10a) fork blades
(10b) fork blades
(10c) detent
(10d) detent
(11) optical guide channel
(11a) front end face
(11b) back end face
(12) light-emitting diode

The invention claimed is:
1. An optical sensor for detecting objects within a monitored area, said sensor comprising:
at least one transmitter adapted to emit light rays;
at least one receiver adapted to receive transmitted light rays;

an evaluation unit adapted to generate an object detection signal in dependence on the signals received by the at least one receiver;

an optical element including a first and second segment that respectively form a Fresnel lens adapted to form a light beam with the transmitted light rays and/or the received light rays; and an optical guide channel including a front end face located in a plane defined by the optical element, wherein the front end face comprises an indicator element, the optical element and the optical guide channel forming a single part consisting of the same injection-molded plastic part; and a light-emitting diode attached to a back end face of the optical guide channel, wherein the light-emitting diode is adapted to emit visible rays that are guided inside the optical guide channel, and wherein the visible rays emitted by the light-emitting diode form optical signals visible on the indicator element.

2. The optical sensor according to claim 1, wherein the first segment of the optical element functions as a transmitting optic forming a beam with the transmitted light rays.

3. The optical sensor according to claim 1, wherein the second segment of the optical element functions as a receiving optic focusing the received light rays onto the receiver.

4. The optical sensor according to claim 1, wherein the first and second segments of the optical element are connected via a continuous web, which is a component of the injection-molded plastic part.

5. The optical sensor according to claim 1, wherein the first and second segments of the optical element are connected via two webs positioned along opposed edges of the injection-molded plastic part, wherein the opposed edges are separated by a gap, and the two webs are integral components of the injection-molded plastic part.

6. The optical sensor according to claim 1, further comprising a casing, wherein the optical sensor is integrated into the casing.

7. The optical sensor according to claim 6, further comprising holding arms formed integrally with the optical element and adapted to secure the injection-molded plastic part to the casing.

8. The optical sensor according to claim 7, wherein the holding arms extend from opposite ends of the injection-molded plastic part, and extend perpendicular to a plane defined by the optical element.

9. The optical sensor according to claim 7, wherein the holding arms function as lock-in means.

10. The optical sensor according to claim 1, wherein the injection-molded plastic part comprises polycarbonate.

11. The optical sensor according to claim 1, wherein the injection-molded plastic part comprises PMMA.

12. The optical sensor according to claim 1, wherein the optical sensor comprises a light scanner, a reflective light barrier, or a distance sensor.

13. The optical sensor according to claim 1, wherein the optical guide channel defines a longitudinal axis that extends perpendicular to the plane defined by the optical element.

14. An optical sensor for detecting objects within a monitored area, said sensor comprising:

at least one transmitter adapted to emit light rays;

at least one receiver adapted to receive transmitted light rays;

an evaluation unit adapted to generate an object detection signal in dependence on the signals received by the at least one receiver;

an optical element including a first and second segment that respectively form a Fresnel lens adapted to form a light beam with the transmitted light rays and/or the received light rays;

an optical guide channel including a front end face located in a plane defined by the optical element, wherein the front end face comprises an indicator element, the optical element and the optical guide channel forming a single part consisting of the same injection-molded plastic part;

a light-emitting diode attached to a back end face of the optical guide channel, wherein the light-emitting diode is adapted to emit visible rays that are guided inside the optical guide channel, and wherein the visible rays emitted by the light-emitting diode form optical signals visible on the indicator element;

a casing into which the optical element is integrated; and holding arms formed integrally with the optical element and adapted to secure the injection-molded plastic part to the casing, wherein the holding arms function as a lock-in device.

* * * * *